United States Patent
Manber

(10) Patent No.: US 8,260,777 B1
(45) Date of Patent: Sep. 4, 2012

(54) SERVER SYSTEM AND METHODS FOR MATCHING LISTINGS TO WEB PAGES AND USERS

(75) Inventor: Udi Manber, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 1137 days.

(21) Appl. No.: 11/223,809

(22) Filed: Sep. 9, 2005

(51) Int. Cl.
*G06F 17/30* (2006.01)

(52) U.S. Cl. .................... 707/731; 705/14.1; 715/962

(58) Field of Classification Search .............. 273/277; 715/962; 705/14
See application file for complete search history.

(56) References Cited

U.S. PATENT DOCUMENTS

| | | | |
|---|---|---|---|
| 5,948,040 A * | 9/1999 | DeLorme et al. ............ 705/5 |
| 6,381,594 B1 * | 4/2002 | Eichstaedt et al. ........... 707/3 |
| 6,549,904 B1 * | 4/2003 | Ortega et al. ............. 707/10 |
| 6,778,975 B1 | 8/2004 | Anick et al. |
| 6,803,926 B1 * | 10/2004 | Lamb et al. ............ 715/744 |
| 6,842,773 B1 * | 1/2005 | Ralston et al. ........... 709/206 |
| 6,904,410 B1 * | 6/2005 | Weiss et al. ............. 705/27 |
| 7,191,147 B2 * | 3/2007 | Heene et al. ............. 705/26 |
| 7,457,397 B1 * | 11/2008 | Saylor et al. .......... 704/270.1 |
| 2001/0014868 A1 | 8/2001 | Herz et al. |
| 2002/0019763 A1 * | 2/2002 | Linden et al. ........... 705/10 |
| 2002/0046099 A1 * | 4/2002 | Frengut et al. .......... 705/14 |
| 2002/0082923 A1 * | 6/2002 | Merriman et al. ......... 705/14 |
| 2002/0087660 A1 | 7/2002 | Martin et al. |
| 2002/0095379 A1 * | 7/2002 | Likourezos et al. ........ 705/40 |
| 2002/0120506 A1 * | 8/2002 | Hagen ................. 705/14 |
| 2002/0128934 A1 * | 9/2002 | Shaer ................. 705/27 |
| 2003/0217059 A1 * | 11/2003 | Allen et al. ............. 707/10 |
| 2004/0015397 A1 | 1/2004 | Barry et al. |
| 2004/0199496 A1 * | 10/2004 | Liu et al. .............. 707/3 |
| 2004/0220791 A1 * | 11/2004 | Lamkin et al. ........... 703/11 |
| 2004/0254853 A1 * | 12/2004 | Heene et al. ............ 705/26 |
| 2005/0004754 A1 * | 1/2005 | Hayes ................. 701/209 |
| 2005/0038688 A1 * | 2/2005 | Collins et al. ............ 705/9 |
| 2005/0038717 A1 | 2/2005 | McQueen, III et al. |
| 2005/0091106 A1 * | 4/2005 | Reller et al. ............. 705/14 |
| 2005/0114229 A1 * | 5/2005 | Ackley et al. ........... 705/26 |
| 2005/0131762 A1 | 6/2005 | Bharat et al. |
| 2005/0144158 A1 * | 6/2005 | Capper et al. ............ 707/3 |

(Continued)

OTHER PUBLICATIONS

Gibbs, "The EBay Seller's Guide", May 1, 2005, www.auction-revolution.com/sellerguide.shtml, retrieved Nov. 6, 2007, p. 1-18.*

(Continued)

*Primary Examiner* — Khanh Pham
(74) *Attorney, Agent, or Firm* — Knobbe, Martens, Olson & Bear LLP

(57) ABSTRACT

A listing creation application provides functionality for a listing provider to create a listing to be displayed on web pages, and to associate this listing with a content descriptor that specifies the type of content to which the listing is to be matched. The content descriptor may, for example, be a topic selected from a hierarchy of topics, a keyword, or a keyword phrase. Upon selecting a particular content descriptor, the listing provider is presented with a corresponding list of user classes with which the listing may be associated. A real time matching engine uses a listing's associations with specific content descriptors and user classes to match the listing to web page requests, such that the listings selected for presentation to a user are dependent upon both the profile of the user and the type of content being requested.

9 Claims, 3 Drawing Sheets

U.S. PATENT DOCUMENTS

| | | | | |
|---|---|---|---|---|
| 2005/0166233 | A1* | 7/2005 | Beyda et al. | 725/46 |
| 2005/0216335 | A1* | 9/2005 | Fikes et al. | 705/14 |
| 2005/0278644 | A1* | 12/2005 | Greaves et al. | 715/760 |
| 2006/0026067 | A1* | 2/2006 | Nicholas et al. | 705/14 |
| 2006/0212447 | A1* | 9/2006 | Davis et al. | 707/6 |
| 2006/0247981 | A1* | 11/2006 | Singh et al. | 705/26 |
| 2007/0027762 | A1* | 2/2007 | Collins et al. | 705/14 |
| 2007/0038931 | A1* | 2/2007 | Allaire et al. | 715/526 |
| 2007/0067297 | A1* | 3/2007 | Kublickis | 707/9 |
| 2008/0319992 | A1* | 12/2008 | Mathai et al. | 707/5 |

OTHER PUBLICATIONS

Karp, "eBay Hacks: 100 Industrial-Strength Tips & Tools", O'Reilly Press, p. 7, 19, 26,28,32,34,35,38,44,45,49,56,78,85-88, 102, 110-115,123, 148, 174, 195-198, 244-245,264-265, 310.*

Karp, "EBay Hacks: 100 Industrial-Stringth Tips & Tools", Jun. 2005, O'Reilly Press, 2nd Edition, Hack #12, Repaginated numbering of p. 1-3 (approx. mapping from pp. 28-31). <Retrieved from Safari Books Dec. 22, 2008>, hereinafter Karp2.*

Pavlov et al, "Supporting Privacy in Decentralized Additive Reputation", Mar. 2004, 2nd International Conf. on Trust Mgt., p. 1-11, <Retrieved from http://www.cs.huji.ac.il/~jeff/papers.html May 21, 2009>.*

Motani et al, "Peoplenet: engineering a wireless virtual social network", Aug. 2005, MobiCom'05, ACM Press, 15 pages, <Retrieved from CiteSeer May 21, 2009>.*

Spring et al, "3 Minutes: The Man Behind Craigslist", Nov. 2004, PC World, p. 32, <Retrieved from PC World May 21, 2009>.*

"Business: The online ad attack; Internet advertising." The Economist Apr. 30, 2005: 63. ABI/INFORM Global. ProQuest, May 21, 2009 <http://www.proquest.com/ on May 21, 2009>.*

* cited by examiner

Create Your Listing

Your listing will be displayed on pages associated with the following topic: Photography > Digital Photography

Select a target audience (select user categories to exclude)

- [ ] All Users (default)
- [x] Users who have recently purchased a digital camera
- [ ] User who have not recently purchased a digital camera
- [ ] Users who have purchased a camera that uses a compact flash card
- [ ] Advanced photography users
- [x] Users who have not recently purchased a photo printer Enter the text of your listing:

> Upload, distribute and print your photos online.
> www.ABCPhotos.com

Enter your bid for this listing: $ [      ]

[ Submit ]

FIG. 2

SERVER SYSTEM AND METHODS FOR MATCHING LISTINGS TO WEB PAGES AND USERS

BACKGROUND OF THE INVENTION

1. Field of the Invention

The present invention relates to user interfaces and document processing methods for controlling the selection of listings from a database to display on web pages.

2. Description of the Related Art

Various types of systems exist for displaying "paid placement" type listings on web pages. One type of system allows listing providers to associate their respective listings with specific keywords. When a user submits a search query to an Internet search engine, the listing or listings associated with the keyword or keywords entered by the user are displayed on the resulting search results page—typically under a heading such as "sponsored links" or "sponsored results." The display position of each such listing, and the amount paid by the corresponding listing provider if the listing is clicked on by a user, are typically dictated by an associated bid amount specified by the listing provider. Typically, the listings are displayed on a variety of different independent web sites through a process known as syndication.

In some systems of the type described above, the listing providers can additionally specify target geographic regions in which their listings are to be displayed. For example, a merchant that does business in a particular geographic region may, in addition to associating its listing with one or more keywords, request that the listing be displayed to users in that region. In such systems, the IP (Internet Protocol) addresses associated with the search requests are used to identify or predict the locations of the users.

Another type of system operates by selecting paid placement listings to display on relatively static web pages by performing content-based analyses of such pages. For example, Google's AdSense program allows web site operators to configure selected pages of their respective web sites to display or "host" listings served by a remote listing server. To select appropriate listings to display on a given page, a crawler program analyzes the textual content of the page, and attempts to match the page's content to relevant listings.

A significant problem with these systems is that they typically select paid placement listings to display on web pages without taking into consideration information about the preferences or prior actions of the user who is requesting the page. As a result, the listings are frequently of little or no value to the target user.

SUMMARY OF THE INVENTION

The present invention comprises a listing generation and matching system that enables listing providers to more accurately and precisely target listings to web users. The invention may, for example, be implemented in conjunction with an electronic catalog system that maintains profiles (browse histories, purchase histories, rental histories, histories of searches performed, product reviews submitted, etc.) of users of an electronic catalog of items.

In one embodiment, the listing generation and matching system includes a listing creation application that provides functionality for a listing provider to create a listing, and to associate this listing with a content descriptor that specifies the type(s) of web page content to which the listing is to be matched. The content descriptor may, for example, be a topic selected from a browsable hierarchy of topics, a keyword, or a keyword phrase. Upon selecting a particular content descriptor, the listing provider is also presented with a corresponding list of target user classes or attributes with which to associate the listing. For example, if the content descriptor "digital photography" is selected, the listing provider may be given the option to associate the listing with one or more of the following user classes: "recent purchasers of a digital camera," "recent purchasers of digital cameras having a ComactFLASH slot," "users who have recently viewed a digital camera without making a purchase," "users who purchased a photo printer, photo paper, or photo printer ink in last N days" "users who have a digital camera in their respective shopping carts," "users who viewed a product detail page of a digital camera during the current browsing session," "all users."

Listings created by listing providers via the listing creation application are stored in a database in association with the designated content descriptors and user classes. A real time matching engine uses these associations to dynamically select listings from the database to display on web pages. For example, when a user requests a particular web page, the real time matching engine may attempt to locate one or more listings that are associated with both (a) a content descriptor that matches the content being requested by the user, and (b) an associated user class of which the user is a member. For instance, if a user who recently purchased a digital camera requests a catalog page, or submits a search query, related to digital photography, the matching engine may select a listing that is associated with both the content descriptor "digital photography" and the user class "recent purchasers of a digital camera."

The user profile data used by the real-time matching engine may come from any source or combination of sources, including but not limited to web sites that collect user-specific information about the browsing activities of users. Listings selected by the matching engine may be displayed exclusively on pages of a single web site, such as a web site that maintains user profiles of its users, or may be displayed across multiple distinct web sites using syndication methods.

Neither this summary nor the following detailed description purports to define the invention. The invention is defined by the claims.

BRIEF DESCRIPTION OF THE DRAWINGS

FIG. 2 illustrates an example web page of a user interface for creating listings that are associated with specific topics and user classes.

DETAILED DESCRIPTION OF THE PREFERRED EMBODIMENTS

Specific embodiments of the invention will now be described with reference to the drawings. These embodiments are provided in order to illustrate, and not limit, the invention. The scope of the invention is defined only by the claims.

I. OVERVIEW

Figure 1:
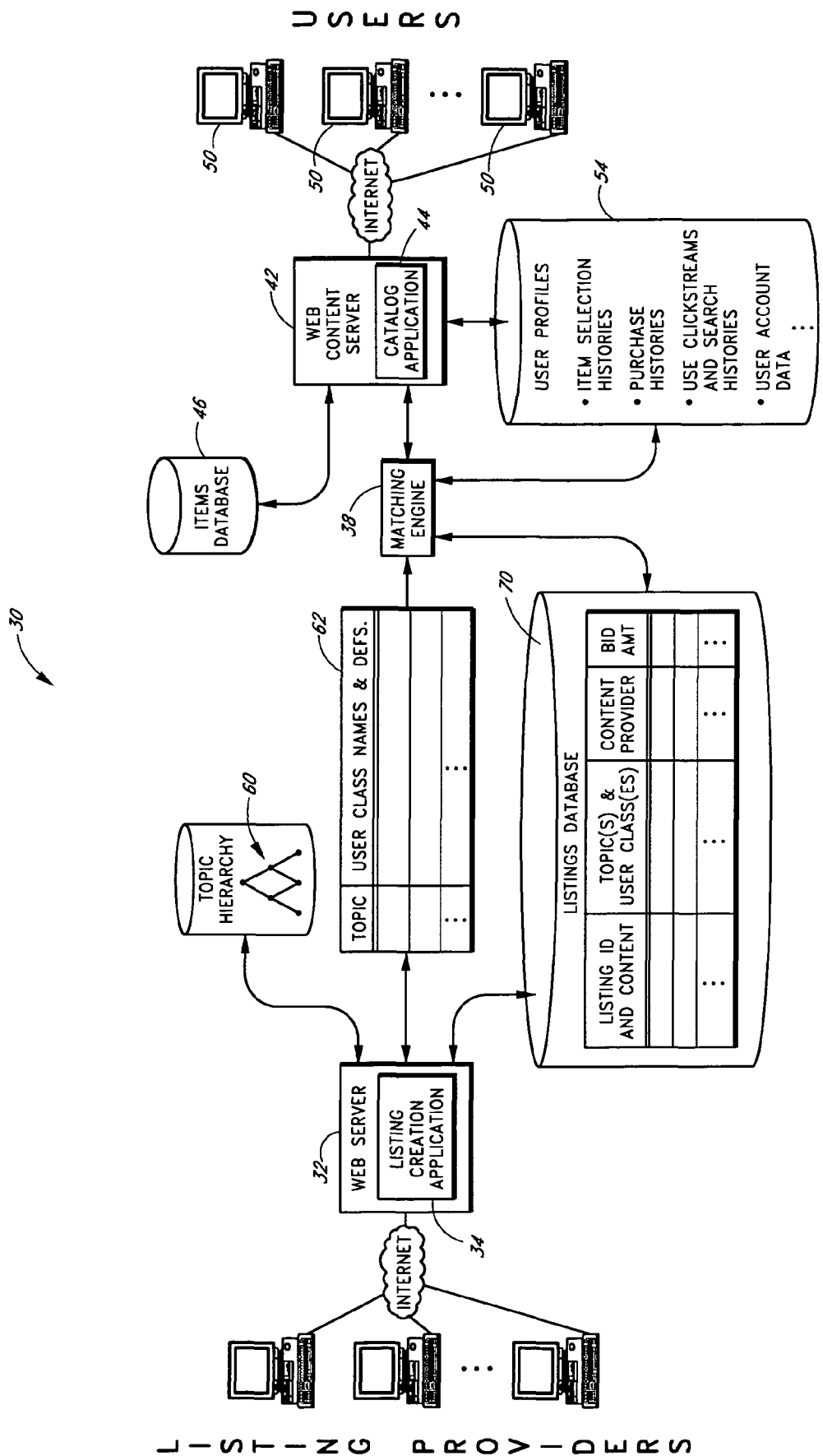
FIG. 1 illustrates a listing generation and matching system according to one embodiment of the invention.

FIG. 1 illustrates a listing generation and matching system 30 according to one embodiment of the invention. As illustrated, the system 30 includes a web server system 32 that hosts a web-based listing creation application 34. The listing creation application 34 provides a user interface and functionality for listing providers, such as those wishing to advertise specific products or services, to type in or upload paid placement or "sponsored link" type listings (typically in the form of clickable advertisements), and to associate or "link" these listings with specific topics and user attributes. For instance, a company wishing to advertise its online photo print service may define a clickable ad listing for its service, and associate the listing with both the topic "digital photography" and the user attribute "has recently purchased digital camera."

A matching engine 38 uses these associations to match listings to web pages and users in real time as pages are requested. For instance, the matching engine 38 may select the online photo print service listing for display primarily or exclusively when a user who has recently purchased a digital camera requests a web page, or conducts a search, related to digital photography. Because the listings are selected based on the context of the user's browsing session (e.g., the search being performed or the type of page being accessed), and based further on attributes of the particular user, the listings are more likely to be of interest to the users.

The listings are preferably selected by the matching engine 38 for display on pages of a web site served by a second web server system 42, referred to herein as a web content server. The web content server 42 hosts a web-based catalog application 44 that provides browsable and searchable access to a database 46 of catalog items. The catalog items stored or represented in the database 46 may, for example, include physical products that can be purchased or rented, digital products (journal articles, news articles, music files, video files, software downloads, etc.) that can be purchased and/or downloaded by users, web sites arranged by category within a web site directory, subscriptions, and/or other types of items that may be browsed and selected from a catalog.

The matching engine 38 may run on the physical server or servers of the web content server 42, or may run on one or more separate physical servers. In some embodiments, a single matching engine 38 may select ads to display on multiple distinct web sites hosted by physically distinct web server systems. Well-known listing syndication methods may be used for this purpose.

As depicted by the user computing devices 50 in FIG. 1, users may access the web content server 42 and associated web site over the Internet via a web browser to locate catalog items of interest. To assist users in locating items, the catalog application 44 may provide a browse tree in which the catalog items are arranged by category, and/or a search engine through which users can submit search queries to search for specific items. Depending on the nature of the particular system, the catalog application 44 may also include functionality for users to purchase, download, review, rate, sell, and/or access specific catalog items.

As depicted in FIG. 1, information about the users is recorded by the web content server 42 within a "user profiles" data repository 54. This data repository 54, which may include one or more databases, stores a variety of different types of data about the actions performed by particular users. The data stored for a given user may include an "item selection history" indicative of the catalog items selected by the user for purchasing, downloading, viewing, rating, reviewing, renting, selling, adding to a shopping cart, adding to a rental queue, accessing, and/or performing some other type of affinity-evidencing action. Each item selection event recorded in the user's item selection history may, for example, include an event time/date stamp, an identifier of the selected item and item category, and an identifier of the type of selection action performed (e.g., purchase, view, shopping cart add, etc.). Other types of profile information may also be stored in the user profile data repository 54, including, for example, email addresses, shipping addresses, search histories, browse category selection histories, subscriptions, and memberships. As described below, these and other types of user profile data may be used directly or indirectly by the matching engine 38 to select listings to display on web pages. Some of the profile data, and particularly profile data associated with users' clickstreams, may be collected and stored as described in US Patent Pub. 2005/0033803 and/or U.S. Pat. No. 6,912,505, the disclosures of which are hereby incorporated by reference.

With further reference to FIG. 1, the system 30 includes a hierarchy 60 of subjects or "topics" with which listings may be explicitly associated. The topics may, but need not, include categories of items in the database 46, such as browse categories of a browse tree. The following are examples of topics and subtopics that may be included in the hierarchy: Electronics/DVD Players; Financial Services/Tax Preparation Services; Web Sites/Online Communities/Social Networking Sites. Many hundreds or thousands of different topics may be provided within the hierarchy 60. Listing providers may browse or search this hierarchy 60 via the listing creation application 34 to select specific topics with which to associate their listings. Each topic serves generally as a content category or descriptor for matching listings to web pages, and may be represented in computer storage by a topic name and an associated topic ID. As discussed below, the system 30 may additionally or alternatively support the ability for listing providers to associate their listings with specific keywords and keyword phrases.

As further illustrated in FIG. 1, the system 30 also includes a table or other structure 62 that specifies, for at least some of the topics in the hierarchy 60 (or alternatively, for specific keywords and keyword phrases), corresponding user "classes" that may be selected by the listing provider to designate a target audience. Each such class may be defined by a set of one or more user attributes. Examples of classes that may be defined within the system include the following:

users who have purchased a DVD player in last six months;
 users who have downloaded at least one music file;
 users with shipping addresses in San Francisco area;
 users with email addresses associated with software companies;
 users who have sold items via an electronic marketplace;
 users who have searched for <keyword> during current browsing session;
 users who have birthdays within the next N weeks;
 users who have purchased items for children;
 users who have purchased a book on house remodeling;
 users with an item falling in category C in their shopping carts or on their wish lists;
 users who are members of an online social networking service;
 users with subscriptions to publication P;
 users who have made at least one purchase.

As indicated by these example user classes, at least some of the user classes are preferably unique to a particular topic, or subset of related topics, within the topical hierarchy 60. In other cases, the user classes may be generally applicable to all of the topics within the hierarchy 60. A given topic may be associated with zero, one, or multiple different user classes. The user classes that are provided for a given topic may be specified manually by a system administrator, and/or may be defined automatically via an automated computer process that detects associations between particular user attributes and particular topics. In addition to using predefined user classes, the system may allow the listing provider to define their own classes of target users. For example, the user interface of the listing creation application 34 may display a list of user attributes that may be used to define a new user class, and may provide check boxes for selecting a set of user attributes to use.

Listing providers may use the listing creation application 34 to create new listings generally as follows. Initially, the listing provider browses or searches the hierarchy 60 via a web browser to locate a topic of interest. In some embodiments, the listing providers may only be permitted to associate their listings with topics falling at certain levels of the hierarchy 60, such as the lowest (most specific) level or levels. Upon identifying a desired topic, the listing provider can, for at least some topics, select from a topic-specific list of user classes to which the listing is to be targeted (see FIG. 2, discussed below). Selection of topics and user classes may be performed by inclusion (e.g., associate ad with "electronics/DVD Players/Owner of DVD Player") and/or by exclusion (e.g., associate ad with all subtopics of "electronics" except "televisions.")

The listing provider may also type in or upload the text or other content of the listing. Typically, each listing includes a short textual description (e.g., "Unlimited DVD Rentals for $19/Month") and a link to an associated web site of the listing provider. Other types of listings, including auction listings, classified ad listings, and job listings, may also be supported.

The listing provider may also be permitted or required to specify other listing parameters. For example, the listing provider may specify an associated bid amount. The bid amount may be equal to, or may be used to determine, the monetary amount that will be charged to the listing provider each time the listing is clicked on (selected) by a user. The bid amounts may also be used to rank listings for display. Although bidding is preferably used, other types of compensation schemes, including fixed pricing, may alternatively be used. Other types of listing parameters that may be specified by the listing provider include, for example, duration of listing and maximum dollar amount to be charged per unit of time.

The user interface for creating listings may also allow the advertiser/listing provider to specify different bid amounts for different user classes within a given topic. This may be useful where, for example, the advertiser wishes to target multiple user classes, but has different preferences for different user classes. For instance, a target user who purchased a digital camera within the last few months may be deemed more valuable to an advertiser of camera accessories than a target user who simply browsed a digital camera catalog page. Therefore, the advertiser may wish to bid higher for one user class versus another user class.

FIG. 2 illustrates an example web page of the listing creation application's user interface. In this example, the listing provider/advertiser has navigated the topical hierarchy 60 to the topic "digital photography," and has entered the text of a listing (advertisement) to associate with this topical category. The web page displays a set of check boxes that allow the listing provider to optionally limit the display of the listing to one or more classes of users. The listing provider can also specify a bid amount for the listing. Although only a single bid field is provided in this example, separate bid fields may alternatively be provided for each of the user classes.

As further depicted in FIG. 1, listings generated by listing providers via the listing creation application 34 are stored in a listings database 70. Each listing may be stored in this database 70 in associate with identifiers of the topic(s) and user class(es) with which the listing is associated, an identifier of the listing provider, a bid amount (if bidding is used), and other listing parameters such as those listed above. In some embodiments, a given listing may be stored in association with multiple different topics, and may be associated with different user classes within each of the multiple topics.

The matching engine 38 accesses the listings database 70 to select and retrieve listings to display on web pages served by the web content server 42. The task of selecting listings is preferably performed in real time in response to search query submissions and/or non-search page requests from users. For example, when a user requests a particular page of the catalog, the matching engine 38 may use both information about the requested page and information about the user to select one or more listings to display on the page. The information about the page may include its content, its location within a directory structure, its pre-assigned topical category, the browse category to which the page corresponds, or any other information that may be used to identify a topic associated with the page. In the case of a search query submission, the matching engine 38 may use the search query itself, and/or the results of the search query, to determine a topic to which the user request corresponds.

The user information taken into consideration by the matching engine 38 may include a history of catalog items viewed, purchased, or otherwise selected, a history of browse categories accessed by the user, a history of search queries submitted by the user, a history of listings selected by the user, the user's shipping address or email address, any combination of the foregoing, and/or any other user profile information that may evidence the user's preferences.

Although the task of analyzing the user profile information may be performed in real time by the matching engine 38, performance may be improved by periodically processing the relevant user profile data, and identifying the user classes to which each user corresponds, in an off-line mode. Thus, the user profile data accessed by the matching engine 38 in response to a given page request may include or consist of a preexisting list of user classes of which the user is a member.

Figure 3:
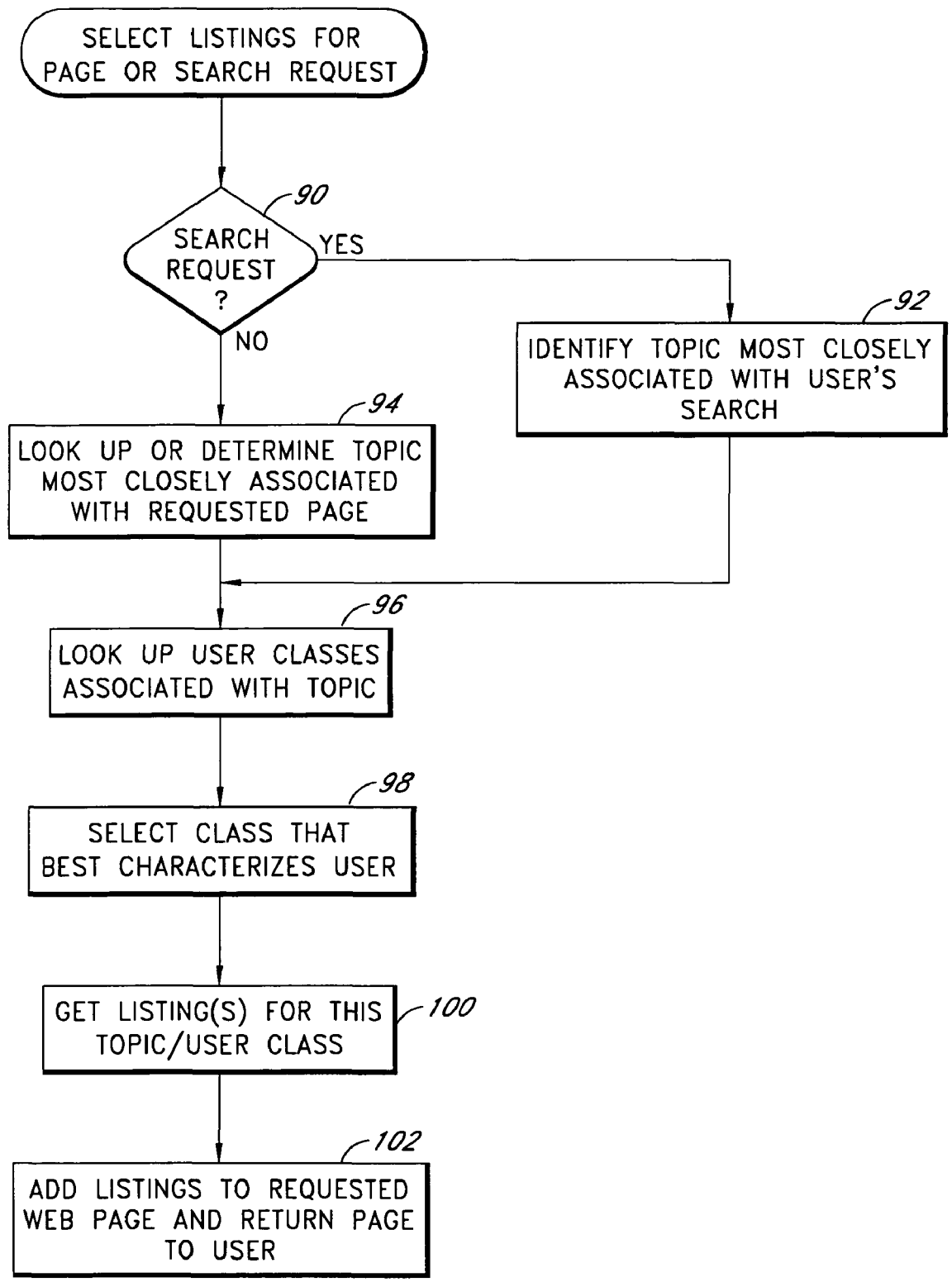
FIG. 3 illustrates a sequence of steps that may be performed by the matching engine of FIG. 1 to select one or more listings to display in response to a user request.

FIG. 3 illustrates a sequence of steps that may be performed by the web content server 42 and matching engine 38 to respond to a search query submission or a non-search page request from a user. As depicted in blocks 90 and 92, if the request is a search request, the topic most closely associated with the user's search query is initially identified. This may be accomplished, for example, by applying the search query to the textual descriptions of the topics in hierarchy 60. General search queries may tend to map to higher level nodes (topics) of the hierarchy 60, while more specific search queries may tend to map to lower level nodes. As mentioned above, the results of the search query may also be used to identify the topic. In either case, the identified topic represents the topic of the requested search results page.

As depicted by block 94, if the user's request is not a search request, the topic is instead identified based on the identity and/or content of the requested page. This may be accomplished by analyzing the page's content in real time to identify the topic most closely associated with the page. Alternatively, the topic may be looked up from a previously generated mapping table that maps pages to topics, or may be read from coding included in the associated HTML document. The page's topic may also be determined based on a location of the page in a directory structure.

Once the topic of the requested page has been identified, the matching engine 38 uses the table 62 to identify the user classes, if any, associated with this topic (block 96). As depicted in block 98, the matching engine 38 then uses profile data of the user to select the user class (or set of user classes) that best characterizes the user. As mentioned above, this task may involve analyzing the user's raw profile data in real time, and/or may involve looking up a previously generated list of the user classes of which the user is a member. If the user is not a member of any of the classes associated with the particular topic, or insufficient user profile data exists to classify the user, one or more listings may be selected based solely on the topic associated with the user's request.

In block 100, the matching engine 38 retrieves from the listings database 70 some or all of the listings associated with both the topic and user class(es) (or just the topic if user class is not applicable). These listings are incorporated into the web page (which may be a search results page) requested by and returned to the user (block 102). The order in which the listings are displayed on the web page may depend on the associated bid amounts, listing relevance scores, and/or other criteria.

As will be apparent from the foregoing, an important benefit of the above-described process for creating and selecting listings is that the advertiser, or other listing provider, can select a target audience both in terms of the type of content being requested and attributes of the users requesting such content. As a result, the displayed listings tend to be highly relevant to the users' interests. To further illustrate how the process may be used, the following examples are provided:

Example 1

An online seller of Spanish-language PC training videos creates an ad listing for its web site. The online seller also links this listing to the topic "Computers," and to the user class "purchasers of Spanish-language items." The listing will thereafter be displayed primarily or exclusively on computer-related web pages, and pages generated in response to computer-related searches, when such pages are accessed by users who have purchased one or more Spanish-language items from the catalog.

Example 2

A seller of enterprise software creates an ad listing for its products, and links this listing to the topic "computer software." The seller additionally links the listing to the user class "users with email addresses corresponding to major software companies," which includes all users having email addresses ending in microsoft.com, oracle.com, etc. The listing is thereafter displayed primarily or exclusively on software-related web pages when such pages are accessed by users who likely work at major software companies.

II. KEYWORD-BASED EMBODIMENTS

The above-described architecture and process may also be used in a system in which the listing providers bid on keywords with which to associate their listings. As with topics, the keywords serve generally as content descriptors that describe the type of web page content to which the listings are to be matched. In one such keyword-based embodiment, the listing provider may initially select a keyword or keyword phrase with which to associate a particular listing. Upon selecting a keyword or keyword phrase, the listing creation application 34 looks up from the table 62, and presents to the listing provider, a set of user classes associated with this keyword or keyword phrase. The listing provider may then have the option to select from this list to specify one or more target user classes. For example, if the keyword phrase "DVD player" is selected, the listing provider may be given the option to select from the following list of user classes: "has purchased DVD player," "has not purchased DVD player," "advanced electronics user," "all users."

The matching process may be similar to that depicted in FIG. 3. For example, when a search request is received, the matching engine 38 may initially identify a set of listings that are associated with a keyword or keyword phrase included in the user's search query. The matching engine 38 may then look up the user classes associated with this keyword or keyword phrase, and if possible, select the class (or set of classes) that best characterizes the user. If such a class is identified, the set of listings may be further refined by selecting only those listings that are linked to this user class (or set of user classes). In the case of a non-search page request, the process may be the same except that the content of the requested page may initially be analyzed to identify a keyword or keyword phrase that characterizes the page.

III. CONCLUSION

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the appended claims, which are intended to be construed without reliance on any definitions that may be set forth in any incorporated-by-reference materials.

What is claimed is:

1. A computer-implemented method of generating web pages that include listings selected from a database, the method comprising:
providing a database that stores listings submitted by listing providers via a user interface of a listing creation application, said listings stored in said database in association with specific content descriptors and target user classes specified by corresponding listing providers via said listing creation application, said listings including a first listing submitted by a first listing provider, wherein the content descriptors include keywords and/or topics for matching the listings to web pages, and at least some of the user classes correspond to different content descriptors than other user classes;
receiving a request for a web page from a user other than the first listing provider, and identifying a content descriptor associated with the request and/or the web page;
identifying a plurality of user classes associated with the content descriptor, and selecting, from the plurality of user classes, a user class that characterizes the user;
selecting at least one listing that is stored in the database in association with the both the content descriptor and the user class, said at least one listing including said first listing submitted by the first listing provider, said user class corresponding uniquely to the content descriptor, and consisting of users that have selected a specified type of catalog item associated with the content descriptor; and
incorporating the at least one listing into the web page for display to the user;
wherein the method is performed by a computerized system that includes one or more physical servers.

2. The method of claim 1, wherein the content descriptors include topics arranged within a hierarchy of topics.

3. The method of claim 2, wherein the step of identifying a content descriptor associated with the request and/or the web page comprises identifying a topic of the web page.

4. The method of claim 1, wherein the request is a search request that includes a search query, and the step of identifying a content descriptor associated with the request and/or the web page comprises identifying a content descriptor associated with the search query.

5. The method of claim 1, wherein the content descriptors include keywords.

6. The method of claim 5, wherein the request is a search request that includes a search query, and the step of identifying a content descriptor associated with the request and/or the web page comprises identifying a keyword included within the search query.

7. The method of claim 1, wherein the first listing is selectable by the user on the web page to access a web site of said first listing provider.

8. The method of claim 1, further comprising providing a web-based listing creation application that provides a user interface and functionality for a listing provider to specify a listing to add to the database, associate the listing with a selected content descriptor, view a list of user classes associated with the selected content descriptor, and select from the list of user classes to specify a target user class.

9. The method of claim 1, further comprising responding to user selection of the first listing, as displayed on said web page, by causing a monetary amount to be charged to the first listing provider.

* * * * *

UNITED STATES PATENT AND TRADEMARK OFFICE
CERTIFICATE OF CORRECTION

PATENT NO. : 8,260,777 B1  
APPLICATION NO. : 11/223809  
DATED : September 4, 2012  
INVENTOR(S) : Manber Page 1 of 1

It is certified that error appears in the above-identified patent and that said Letters Patent is hereby corrected as shown below:

On page 2, in the first line of the second column, change "Stringth" to --Strength--.

In column 8 at line 57, after "with" delete "the".

Signed and Sealed this
Twelfth Day of March, 2013

Teresa Stanek Rea
*Acting Director of the United States Patent and Trademark Office*